United States Patent [19]

Nussbaumer et al.

[11] Patent Number: 4,718,533
[45] Date of Patent: Jan. 12, 1988

[54] TRANSPORT INSTALLATION FOR A PRODUCTION LINE HAVING PARALLEL-ARRANGED PROCESSING STATIONS

[75] Inventors: Manfred Nussbaumer; Bruno Fischer, both of Dietikon, Switzerland

[73] Assignee: Micafil AG, Zurich, Switzerland

[21] Appl. No.: 905,233

[22] Filed: Sep. 9, 1986

[30] Foreign Application Priority Data

Feb. 12, 1986 [CH] Switzerland ............................ 564/86

[51] Int. Cl.$^4$ .............................................. B65G 47/00
[52] U.S. Cl. ................................ 198/346.1; 414/416; 414/222
[58] Field of Search .................. 198/346.1, 346.2, 345, 198/341; 414/422, 416, 222, 225; 29/33 P, 563

[56] References Cited

U.S. PATENT DOCUMENTS

| | | | |
|---|---|---|---|
| 3,648,819 | 3/1972 | Converse, III et al. | 198/346.1 |
| 3,785,475 | 1/1974 | Maynard | 198/345 |
| 3,991,619 | 11/1976 | Appleford et al. | 198/346.2 |
| 4,010,840 | 3/1977 | Eberle | 198/346.2 |
| 4,306,646 | 12/1981 | Magni | 198/341 |
| 4,454,939 | 6/1984 | Kampf et al. | 198/346.1 |
| 4,483,433 | 11/1984 | Fischer et al. | |

FOREIGN PATENT DOCUMENTS 1567587  5/1980  United Kingdom .

Primary Examiner—Robert J. Spar
Assistant Examiner—Cheryl Lynn Gastineau
Attorney, Agent, or Firm—Burns, Doane, Swecker & Mathis

[57] ABSTRACT

A production line for the manufacture of electric parts includes a conveyor belt and a plurality of parallel-arranged processing stations disposed along the belt. Workpiece carriers are transported by the belt. Each processing station includes a lifting mechanism which lifts at least one carrier from the belt for further handling, while leaving the belt unobstructed so that subsequent carriers can be conveyed beneath the lifted carrier. A gripper inserts workpieces onto the raised carrier and/or removes workpieces from the raised carrier. Movable stops are positioned upstream of the lifting mechanism to stop a subsequent carrier as the lifted carrier is lowered back onto the belt.

3 Claims, 5 Drawing Figures

TRANSPORT INSTALLATION FOR A PRODUCTION LINE HAVING PARALLEL-ARRANGED PROCESSING STATIONS

The present invention concerns a transport installation in which workpiece carriers are transported on a conveyor belt between various work stations.

Cycle-independent charging devices are known, which make possible the charging (supplying) and discharging of workpieces in parallel-arranged production machines or in production lines, with a first conveyor being provided for the feeding of workpieces and a second conveyor for their further transportation.

A charging device of this type, known from British Pat. No. 1567587 (corresponding to German laid open print No. 27 19 229), concerns a production machine in which both charging and discharging means are provided, whereby the introduction and, in a further working step, the removal of the workpieces are effected, thereby causing the occurrence of idle times.

A disadvantage of this known arrangement involves the fact that the working time required for charging is relatively long and reduces the capacity of the parallel-arranged production machines and possibly of the entire production line which is determined as a rule by the capacity of the individual production machines.

In order to reduce these idle times, U.S. Pat. No. 4,483,433 (corresponding to Swiss Pat. No. 648,784) proposed a charging device for the feeding and removal of workpieces in combination with charging and discharging installations for parallel-arranged production machines. Each charging and discharging installation was equipped with a double receiver for the workpieces and was arranged to cooperate, on the one hand, with two conveyors in an initial position and, on the other hand, with a workpiece holding device in a charging and a discharging position. One workpiece receiver of the double receiver installation was assigned to the first conveyor and the second receiver was assigned to the second conveyor.

In this manner, in contrast to British Pat. No. 1567587, a working process is obtained which is time-superposed on itself both during the charging and discharging of workpieces. However, a certain loss of time cannot be excluded in the case of parallel-arranged production machines or processing stations or a production line having an extremely short processing time.

A general disadvantage of production lines involves the fact that these installations are always laid out for one product with high production capacities only and thus require long conversion times to be able to handle other products.

It is an object of the present invention to provide a transport installation for a production line having a plurality of cycle-independent parallel-arranged processing stations, in which the individual processing stations operate with an extremely short cycle time per workpiece and wherein both the charging and the removal of the workpieces takes place on a conveyor belt and whereby a more general applicability of the production is assured, together with shorter conversion times.

SUMMARY OF THE INVENTION

In accordance with the present invention, a production line for the manufacture of electric parts includes a conveyor belt and a plurality of parallel-arranged processing stations disposed along the belt. Workpiece carriers are transported by the belt. Each processing station includes a lifting mechanism which lifts at least one carrier from the belt for further handling, while leaving the belt unobstructed so that subsequent carriers can be conveyed beneath the lifted carrier. A gripper inserts workpieces onto the raised carrier and/or removes workpieces from the raised carrier. Movable stops are positioned upstream of the lifting mechanism to stop a subsequent carrier as the lifted carrier is lowered back onto the belt.

The insertion of the workpiece carrier into the rails provided in the lifting mechanism makes it possible to raise it from the conveyor belt into a holding position, whereupon successive workpiece carriers are able to pass through this processing station on the conveyor belt.

Preferably, the carrier can be displaced relative to the lifting mechanism while in a lifted condition. Thus, as soon as a processed workpiece has been transferred by a gripping device into an empty receiver of the lifted workpiece carrier, the workpiece carrier is displaced in a manner such that a workpiece carried by a second receiver may be taken immediately afterwards by the gripping device and transferred to the processing station. As soon as the conveyor belt in the processing station is free of other carriers the workpiece carrier is lowered by the lifting device and transported by the conveyor belt, whereby avoiding waiting times until processing, e.g., winding is complete.

Preferably, the carriers are coded, and a code reader precedes each processing station. Thus, two different workpieces may be processed in predetermined processing stations, whereby the capacity of the production line may be utilized advantageously even for smaller production lots.

The conveyor belt includes a pair of parallel flights traveling in opposite directions. One flight constitutes a return flight. Carrier storage facilities are disposed along each flight. By readying the workpiece carriers for a successive workpiece lot in a preparatory storage facility at the returning conveyor belt flight, conversion times may be avoided.

THE DRAWING

The invention will become more apparent from a preferred embodiment thereof presented in the following drawing wherein.

DETAILED DESCRIPTION OF A PREFERRED EMBODIMENT OF THE INVENTION

Figure 1:
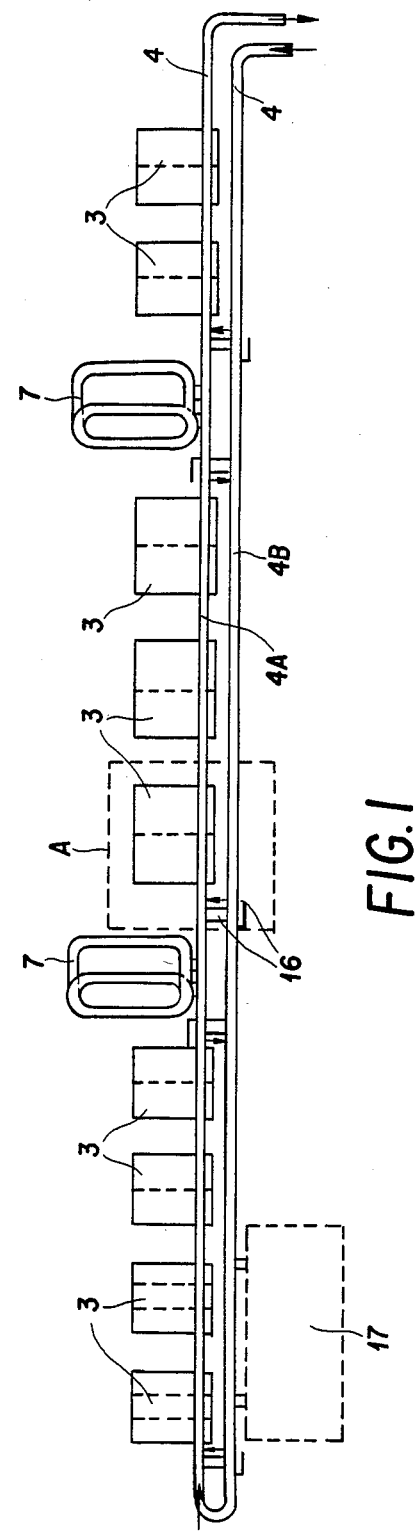
FIG. 1 is a schematic elevational view of a production line shown in part only, together with processing stations placed in parallel.

A production line 2 shown in FIG. 1 comprises, in addition to endless conveyor belt 4, a plurality of processing stations 3 and workpiece carrier storage means 7, arranged in a manner such that workpiece carriers 5 frictionally retained on the forwardly moving conveyor belt 4, may be transported to the processing stations 3 by means of devices shown in FIGS. 2-5 (to be described in more detail below). The belt 4 comprises a forwardly moving flight 4A and a return flight 4B.

Figure 2:
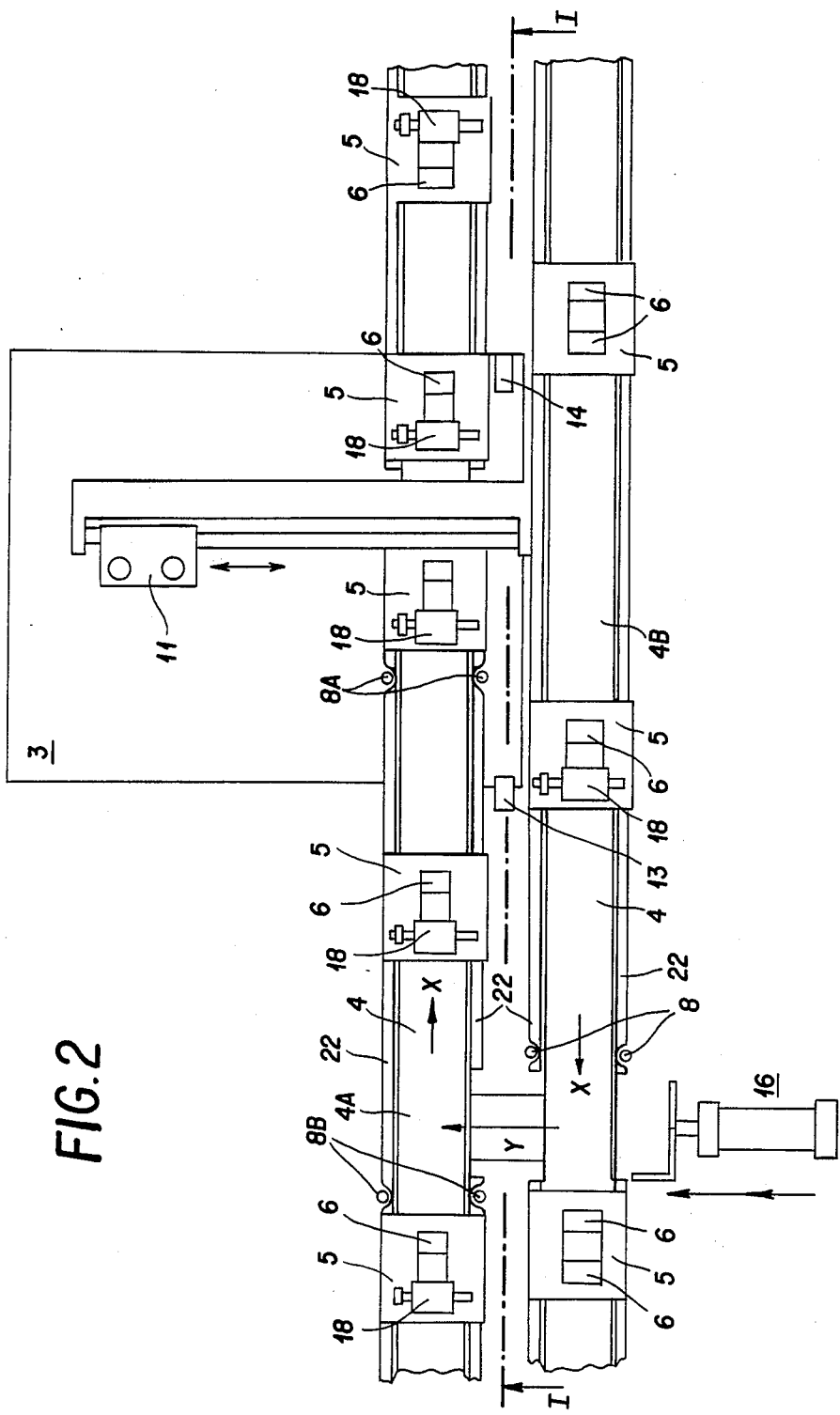
FIG. 2 depicts in top plan view a processing zone A of the production line according to FIG. 1, including a conveying and lifting installation.
Figure 3:
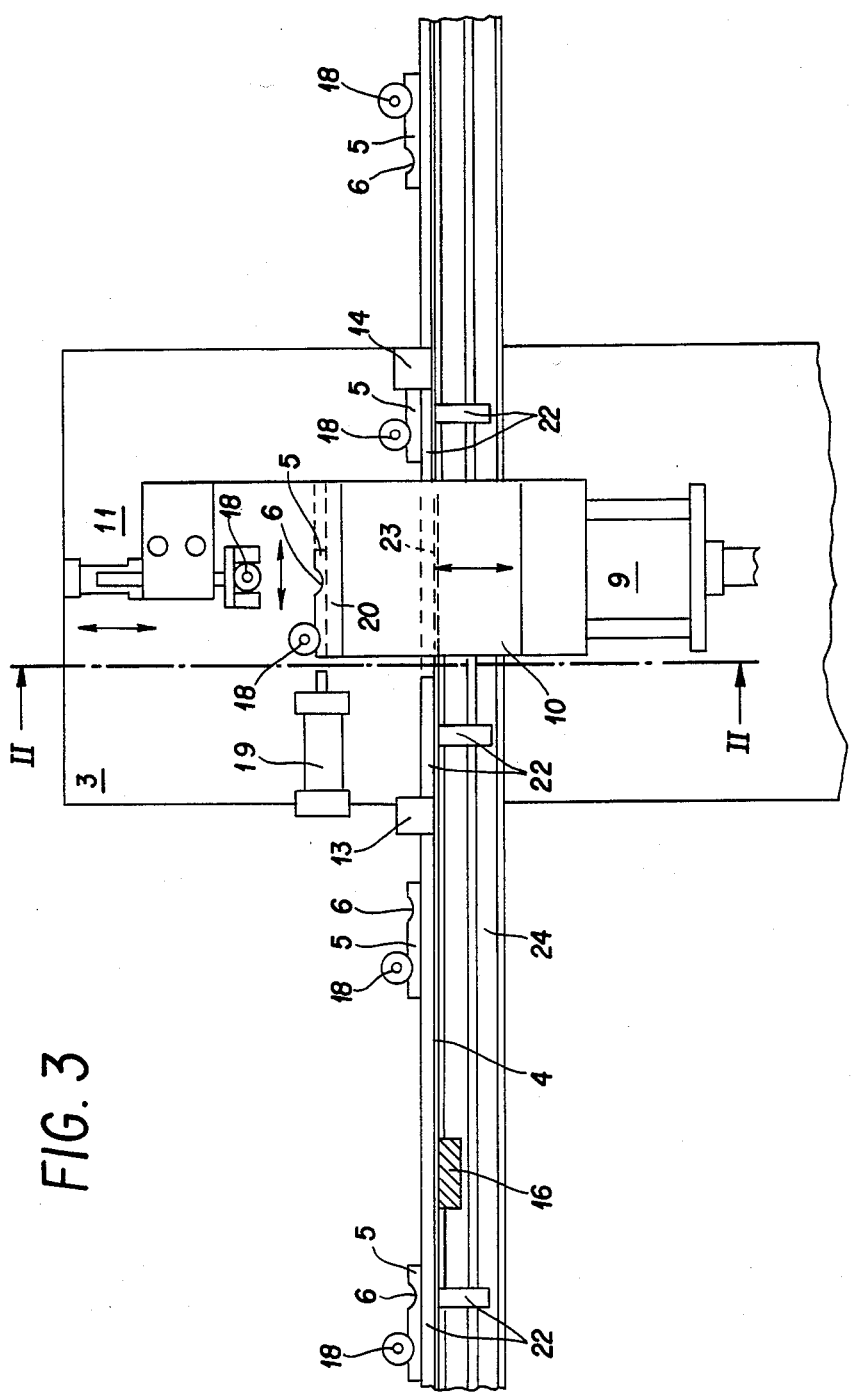
FIG. 3 is an elevational view of the conveying and lifting installation viewed along the section line I—I in FIG. 2.

In FIGS. 2 and 3, a processing zone A is shown in detail, with conveyor belt 4 moving in the direction of the arrows X.

A gripping device 11 overlies the forwardly moving flight 4A with predetermined spacing chosen so that the gripping device 11 is able to lift workpieces 18 from double workpiece receivers 6 of a workpiece carrier 5 and transport the workpieces to a processing machine (not shown). In the meantime, the successive workpiece carriers 5 are moved to the next available processing station 3.

Figure 5:
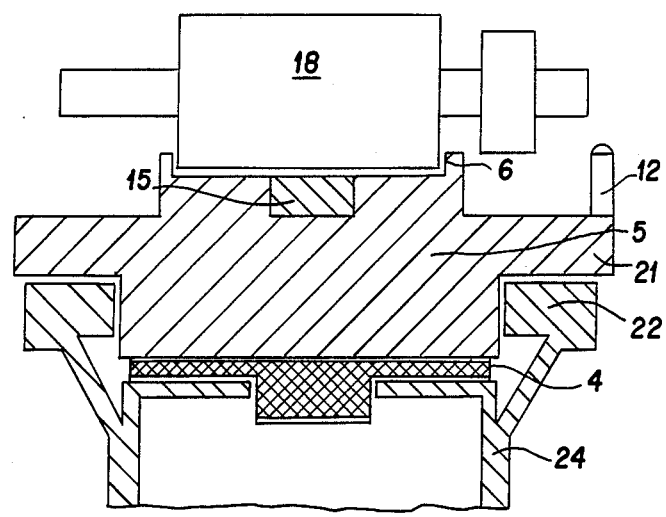
FIG. 5 is an enlarged cross-sectional view through a workpiece carrier resting on the conveyor belt.

Each processing station 3 in a processing zone A (FIGS. 1-3) is preceded by a code reading device 13 and followed by a coding device 14, both of which respond to a code 12 applied to each of the workpiece carriers 5 (FIG. 5). As seen in FIG. 3, the workpiece carriers 5 (loaded, for example, with a workpiece 18) pass by the code reading device 13, whereupon a decision is made on the basis of the code 12 on the workpiece carrier (FIG. 5) whether this workpiece 18 can be processed by the processing station 3, or whether it is to be transported to another processing station.

Figure 4:
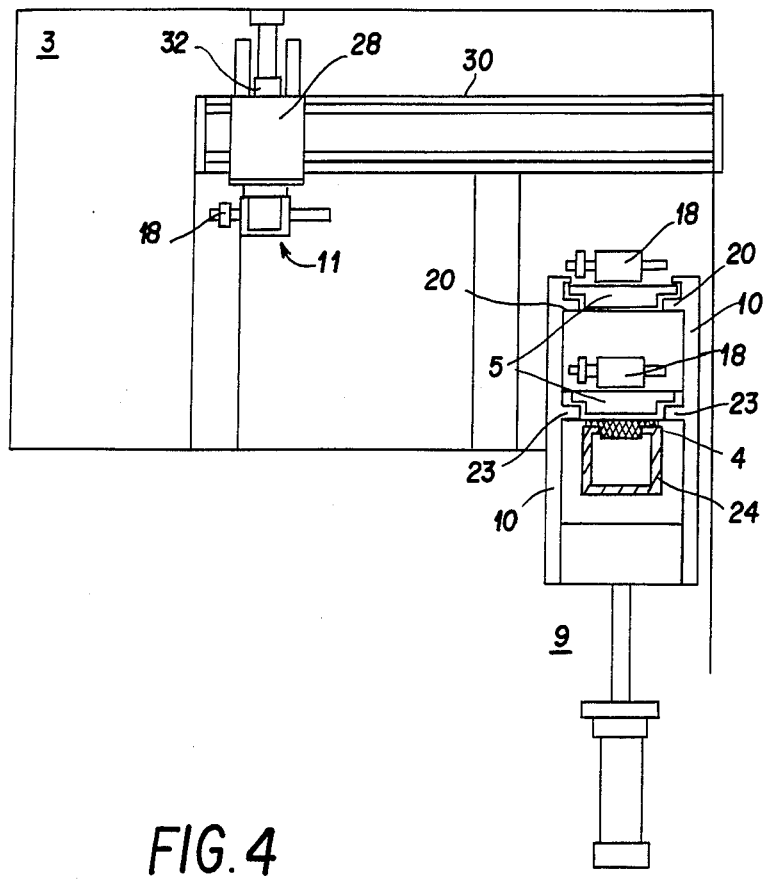
FIG. 4 is a cross-sectional view of the conveying and lifting installation viewed along the section line II—II in FIG. 3.

Under the conveyor belt flight 4A a lifting device 9 is provided (FIG. 4) which is equipped with vertical arms or guide 10 to having rails 20 arranged to engage projections 21 of the workpiece carrier 5. The vertical guides 10 of the lifting device 9 are spaced apart laterally from the conveyor belt 4 and do not interfere with it. FIGS. 3 and 4 depict a condition wherein a processing station 3 has requisitioned, by means of the code reader 13, a correspondingly identified workpiece carrier 5 carrying an empty receiver 6 and a receiver 6 loaded with an unprocessed workpiece 18, and has raised that carrier (via the lifting device 9) from the conveyor belt 4 into the holding position of the processing station 3, while the gripping device 11 holds an already processed workpiece 18. Subsequently, the gripping device 11 places the finished workpiece 18 onto the empty workpiece reciever 6, whereupon a thrust cylinder 19 displaces the workpiece carrier 5 relative to the rails 20 (in a right-hand direction in the drawing) by a workpiece increment, i.e., by approximately one-half of the length of the carrier so that the gripping device 11 is able to take the unprocessed workpiece 18 and transport it to the processing machine. As this occurs, subsequent carriers 5 are able to travel through the lifting device 9. Receiver 6 of carrier 5 has a magnet 15 mounted on its underside adjacent workpiece 18, see FIG. 5.

In order to be able to return the raised carrier to the belt 4, stops 8A (FIG. 2) preceding the processing station 3 halt the further transportation of a successive workpiece carrier 5. The stops 8 are raised and lowered by a suitable mechanism such as fluid motors or electric solenoids. The raised workpiece carrier 5 is then lowered from the holding position onto the conveyor belt 4, whereupon it is entrained by the conveyor belt 4 and passes the coding device 14, which assigns it to another processing station in accordance with the code 12 of the workpiece carrier 5.

Guides 22 (FIG. 5) are located laterally from the conveyor belt 4, which guides are interrupted at each lifting device 9, at each displacing means 16, and at the stops 8 (FIG. 2). The rails 20 are aligned with the guides 22 when the lifting device is in the down position so as to define extensions of the guides 22. Upon lifting of a workpiece carrier 5 by the lifting device 9, auxiliary rails 23 (FIG. 4) provided on the vertical guides 10 become aligned with guides 22 and function as guides while the workpiece carrier 5 is in the raised position.

The displacing means 16, preferably in the form of pneumatic cylinders, makes it possible to handle workpieces which could not be worked in the processing stations because of overloading of the system, or which must follow a different sequence of working operations in the processing of different types of workpieces. The displacing means 16 transfers such workpieces from the return flight 4B onto the forward moving flight 4A, or vice versa (FIG. 1), so that the workpiece carriers 5 may revolve through a range of processing stations. During such transfer, the stops 8B halt any further workpiece carriers 5 arriving on either of the flights 4A, 4B of the conveyor belt 4.

The gripping means 11 is mounted on a support member 28 which can be movable horizontally on a rail 30 by a suitable motor (not shown) carried by the support member 28. A motor 32 carried by the support member raises and lowers the gripping means 11.

Although the present invention has been described in connection with a preferred embodiment thereof, it will be appreciated by those skilled in the art that modifications, substitutions, and deletions, not specifically described, may be made without departing from the spirit and scope of the invention as defined in the appended claims.

What we claim is:

1. In a production line for the manufacture of electric structural parts such as rotors and stators, the production line including a conveyor belt and a plurality of processing stations disposed along the conveyor belt, workpiece carriers mounted on and transported by the conveyor belt, each carrier comprising workpiece receiver means, the improvement comprising lifting means at each processing station for lifting at least one carrier from the conveyor belt into a holding position for further handling while leaving said conveyor belt unobstructed so that subsequent carriers are conveyed on said belt below the lifted carrier, gripping means for selectively removing and inserting workpieces into and from said workpiece receiver means of the lifted carrier, said lifting means arranged to lower the lifted carrier back onto said conveyor belt, and movable stop means adjacent said conveyor belt upstream of said lifting means to stop a subsequent carrier as said lifted carrier is being lowered back onto said conveyor belt, said lifting means being arranged to permit a lifted carrier to be moved horizontally, guided by rails, while seated on said lifting means in a lifted position.

2. In a production line for the manufacture of electric structural parts such as rotors and stators, the production line including a conveyor belt and a plurality of processing stations disposed along the conveyor belt, workpiece carriers mounted on and transported by the conveyor belt, each carrier comprising workpiece receiver means, the improvement comprising lifting means at each processing station for lifting at least one carrier from the conveyor belt into a holding position for further handling while leaving said conveyor belt unobstructed so that subsequent carriers are conveyed on said belt below the lifted carrier, gripping means for selectively removing and inserting workpieces into and from said workpiece receiver means of the lifted carrier, said lifting means arranged to lower the lifted carrier back onto said conveyor belt, and movable stop means adjacent said conveyor belt upstream of said lifting means to stop a suhsequent carrier as said lifted carrier is being lowered back onto said conveyor belt, said lifting means comprising horizontally spaced arms which straddle said conveyor belt, said arms carrying horizontal rails which underlie and lift a carrier.

3. Apparatus according to claim 2 including first carrier guides disposed along opposite sides of said conveyor belt, said first guides being interrupted at each said lifting means, said rails being aligned with said guides when said lifting means is in a lowered position to define extensions of said guides, said arms carrying additional rails below said first-named rails and positioned to be aligned with said guides when said lifting means is in a raised position.

* * * * *